United States Patent [19]

Nickles et al.

[11] Patent Number: 4,827,438
[45] Date of Patent: May 2, 1989

[54] METHOD AND APPARATUS RELATED TO SIMULATING TRAIN RESPONSES TO ACTUAL TRAIN OPERATING DATA

[75] Inventors: Stephen K. Nickles; Lynn K. Wienck; John E. Haley, all of Duncan, Okla.

[73] Assignee: Halliburton Company, Duncan, Okla.

[21] Appl. No.: 33,425

[22] Filed: Mar. 30, 1987

[51] Int. Cl.⁴ ............................................. G05B 17/00
[52] U.S. Cl. ................................ 364/578; 364/424.04; 246/167 R
[58] Field of Search .............................. 364/578, 424; 246/169 A, 169 D, 167 R

[56] References Cited

U.S. PATENT DOCUMENTS

| 2,609,489 | 9/1952 | Roman | 246/122 |
|---|---|---|---|
| 3,046,676 | 7/1962 | Hermann et al. | 35/25 |
| 3,240,929 | 3/1966 | Hughson | 246/167 |
| 3,507,993 | 4/1970 | Mulley | 178/6.8 |
| 3,515,802 | 6/1970 | Wise | 178/6 |
| 3,569,925 | 3/1971 | Tyler et al. | 340/24 |
| 3,621,131 | 11/1971 | Wolff | 178/6.8 |
| 3,639,731 | 2/1972 | McNeill | 235/61.11 E |
| 3,655,962 | 4/1972 | Koch | 246/182 C |
| 3,696,758 | 10/1972 | Godinez, Jr. | 105/61 |
| 3,725,563 | 4/1973 | Woycechowsky | 35/10.2 |
| 3,864,731 | 2/1975 | Callahan | 360/5 |
| 4,031,363 | 6/1977 | Freeman et al. | 235/150.2 |
| 4,041,283 | 8/1977 | Mosier | 235/150.2 |
| 4,042,810 | 8/1977 | Mosier | 235/150.2 |
| 4,072,850 | 2/1978 | McGlynn | 364/424 |
| 4,167,821 | 9/1979 | Gibson, Jr. et al. | 364/578 |
| 4,181,943 | 1/1980 | Mercer, Sr. et al. | 364/426 |
| 4,196,528 | 4/1980 | Foerst | 35/11 R |
| 4,236,215 | 11/1980 | Callahan et al. | 364/436 |
| 4,241,403 | 12/1980 | Schultz | 364/300 |
| 4,258,421 | 3/1981 | Jubasz et al. | 364/424 |
| 4,307,455 | 12/1981 | Juhasz et al. | 364/900 |
| 4,383,827 | 5/1983 | Foerst | 434/69 |
| 4,395,624 | 7/1983 | Wartski | 377/15 |
| 4,561,057 | 12/1985 | Haley, Jr. et al. | 364/436 |

FOREIGN PATENT DOCUMENTS

| 2926654 | 1/1981 | Fed. Rep. of Germany | 364/578 |
| 0072061 | 4/1985 | Japan | 364/578 |
| 2095408 | 9/1982 | United Kingdom . | |
| 2096078 | 10/1982 | United Kingdom . | |

OTHER PUBLICATIONS

"Computer Systems Simulate Braking Conditions for 300-Car Trains," 10/78, Computer Design, vol. 17, No. 10, pp. 52-64.
"TSE LC Series Cases," Apr. 1984, Popular Photography, p. 64.
Zero-Halliburton Ad, Apr. 1984, Popular Photography ad section.
"Train Control Analyzer-A New Concept for Improving Freight Train Handling" presented at the Railway Fuel and Operating Officer's Association Annual Meeting of Sep. 16, 1974.
"New Train-Dynamics Simulator", pp. 39 & 40 of the March, 1975 issue of Progressive Railroading.
Four-page FreightMaster brochure, FM2026-5/-75-4M.
FreightMaster Operator's Manual on the Train Dynamics Analyzer.
Dynamic Sciences Limited brochure entitled "DSL Locomotive Training Simulator".

(List continued on next page.)

Primary Examiner—Parshotam S. Lall
Assistant Examiner—Thomas G. Black
Attorney, Agent, or Firm—James R. Duzan; E. Harrison Gilbert, III

[57] ABSTRACT

A system includes an interface through which actual train operating data can be transferred from a recording medium, such as a magnetic tape, into a train simulator. The date contents of the magnetic tape are generated from real-time data obtained on-board an operating locomotive. For entering additional data, the interface switches a manual data entry terminal to the train simulator in response to a control signal provided by the train simulator. A method incorporating this system simulates train responses to the actual train operating data.

18 Claims, 5 Drawing Sheets

OTHER PUBLICATIONS

"The Dynamics of the Locomotive Simulator," G. B. Adams, a paper presented at the Association of American Railroads Conference on Track/Train Dynamics Interaction, Dec. 15, 1971, Chicago, pp 465–494.

"The Train Handling Indicator," R. E. Tyler, a paper presented at the Association of American Railroads Conference on Track/Train Dynamics Interaction, Dec. 15, 1971, Chicago, pp. 452–463.

"Train Handling Indicator", pp. 1-1 through 1-4 and 3-1 through 3-9.

"Railway Train Simulator," Conductron-Missouri.

"FreightMaster SDA TM Meter System".

"Harris Introduces a System to Monitor, Record, and Analyze Locomotive Conditions for Maintenance and for Train Operations Analysis," The Probe System, Harris Controls, Melbourne, Fla.

Lynn et al. Proceedings of the 29th Vehicular Technology Conference, Arlington Heights, Ill., Mar. 27–30, 1979, pp. 154–157.

Athani, "Microprocessor Based Data Acquisition System," Microprocessors & Microsystems (G.B.), vol. III, No. 8, Oct. 1979, pp. 359–364.

Walters, "2708 EPROM for the S-100," Microcomputing, Sep. 19 79, pp. 78–82.

Cummings, "An Inexpensive and Easy EPROM Board," Microcomputing, Dec. 1979, pp. 62–63.

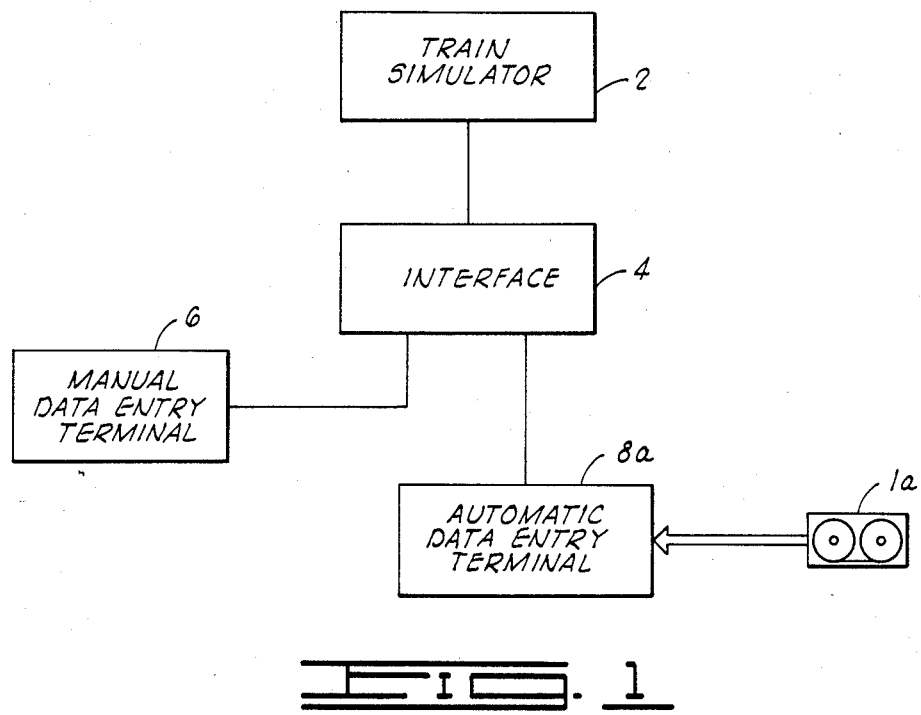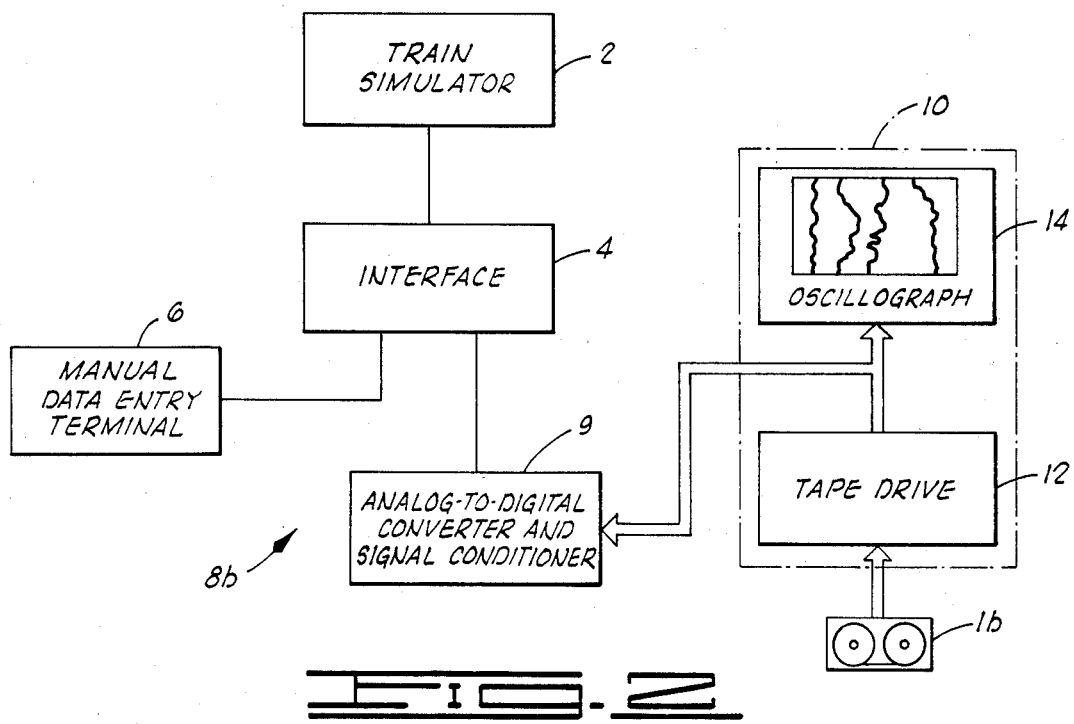

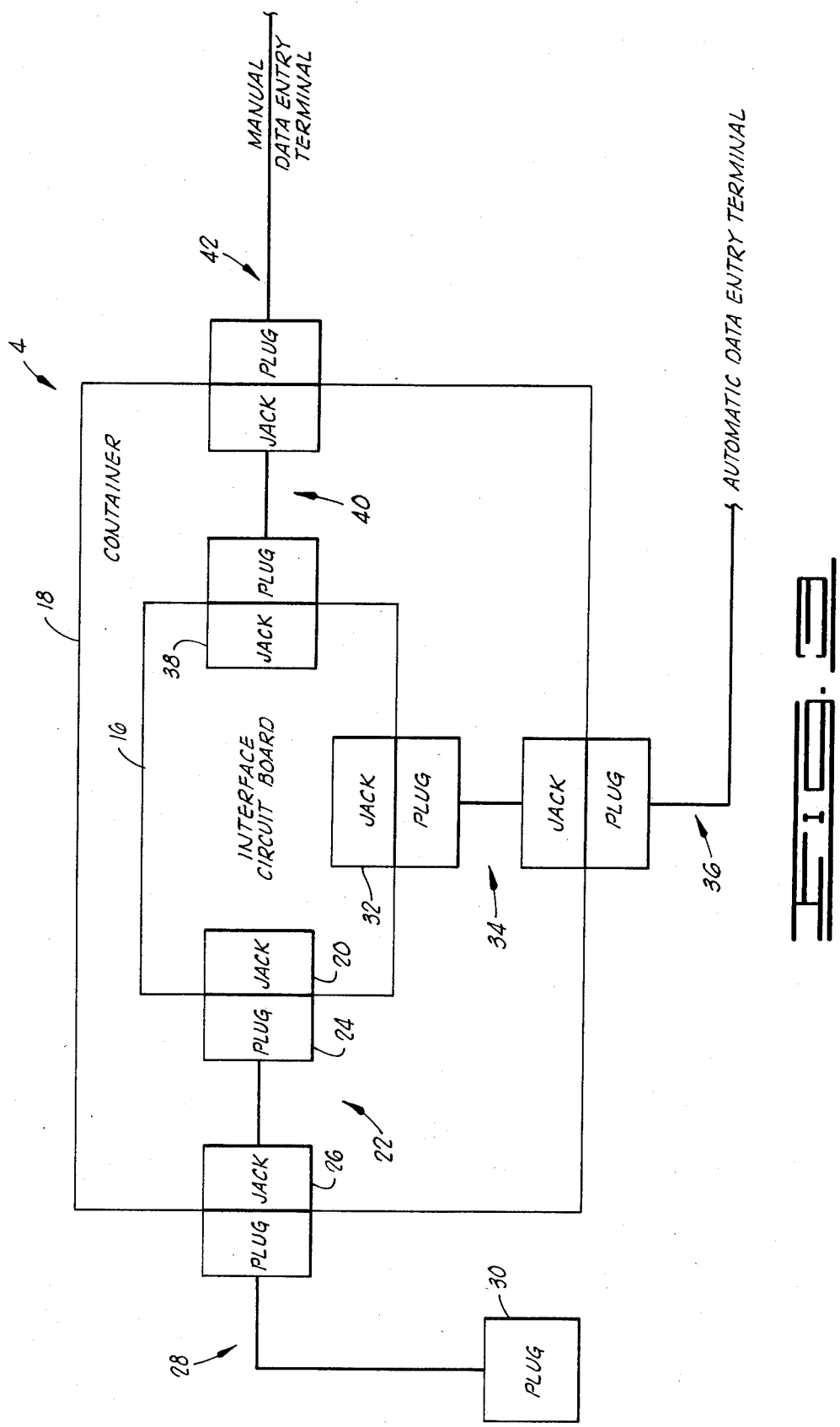

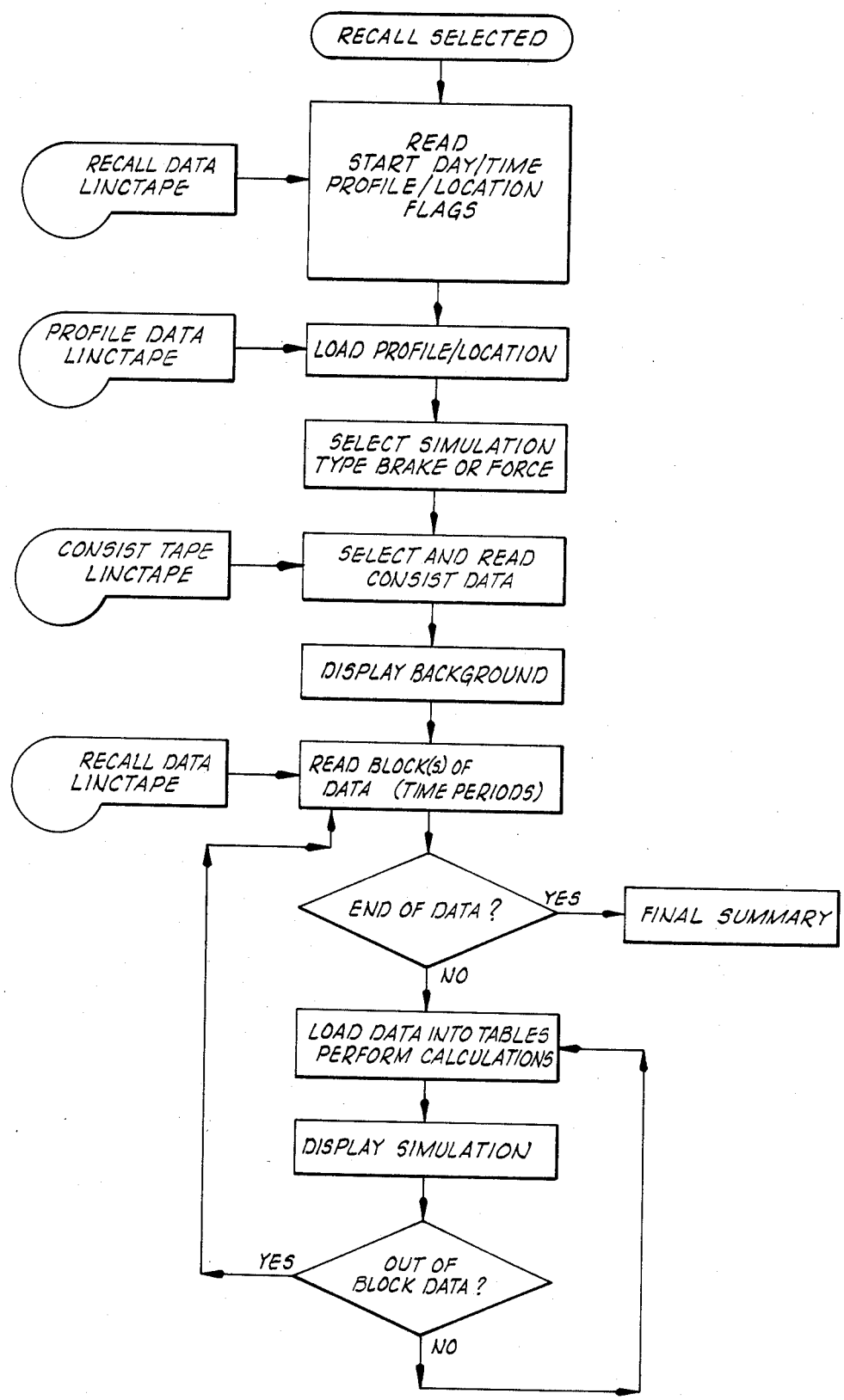

METHOD AND APPARATUS RELATED TO SIMULATING TRAIN RESPONSES TO ACTUAL TRAIN OPERATING DATA

BACKGROUND OF THE INVENTION

This invention relates generally to methods and apparatus related to simulating train responses to actual train operating data and more particularly, but not by way of limitation, to an apparatus for interfacing two data entry terminals to a train simulation computer.

Improving how a locomotive engineer operates a railroad train has been a continuing program within the railroading industry. Train simulators have been proposed and developed for cost-effectively training locomotive engineers under readily changeable conditions. These simulators have controls which are operated by the student to generate control signals simulating those produced on an actual locomotive. These simulated control signals cause a computer in the simulator to compute the responses a selected composition of train (referred to as a train consist) would produce given the simulated control signals. The responses are pictorally, numerically or textually displayed to the student or instructor.

In addition to simulators, on-board equipment has been developed for giving the locomotive engineer more information with which to operate the train more efficiently and safely during its real time operation. At least some of such on-board equipment includes the capability of recording real time data related to the operation of the train for later use in analyzing how the train was operated. Such recordings are useful in critiquing the engineer and investigating accidents, for example.

FreightMaster, a division of Halliburton Company, has been active within this program of providing equipment which is intended to be used to improve how railroad trains are operated. One such equipment is the train simulator known as the Train Dynamics Analyzer. This system is described in U.S. Pat. No. 4,041,283 to Mosier (see also U.S. Pat. No. 4,042,810 to Mosier). Generally, this system couples a computer, a mockup locomotive control stand, a graphics display system, and auxiliary printing devices to permit the in-office dynamic simulation of a railroad train's (particularly, a freight train's) movements and reactions in response to a student's/simulator operator's real time activities at the mockup locomotive control stand. This has been used to train locomotive engineers in the proper handling of train movement.

FreightMaster also markets an apparatus for monitoring motion of a railroad train. This system is described in U.S. Pat. No. 4,561,057 to Haley, Jr., et al. This system permits the display and real time recording of train speed, distance and time of day measurements. When installed on a locomotive, at least a portion of these data are stored in a non-volatile memory. At an appropriate time, these stored data are transferred to a portable data transfer unit which is hand-carried onto the locomotive, connected to the on-board portion of the system to download the non-volatile memory contents, and carried off the train. Some degree of analysis can be made through the data transfer unit. An enhanced monitoring system which permits recordation of additional information is described in copending U.S. patent application Ser. No. 901,212, filed Aug. 28, 1986 and assigned to the assignee of the present invention.

Although such simulators and on-board monitoring and recording equipment have been developed to improve handling of railroad trains, a further enhancement or improvement is believed to be possible through the uniting of the on-board data, which provides some information about the actual operation of an actual train, with a simulator so that more information about the actual operation of the train can be obtained and so that the actual operation can be better simulated and analyzed through the additional capabilities of the simulator.

SUMMARY OF THE INVENTION

The present invention meets the above-noted needs by providing a novel and improved method and apparatus related to simulating train responses to actual train operating data, thereby providing additional information about the actual operation of the train. The present invention includes a new and improved hardware interface and new and improved software combined, in the preferred embodiment, with a suitable existing simulator and manual data entry means and with a suitable existing memory device for storing actual train operating data obtained on-board the train during the actual operation.

The present invention provides a system for simulating train responses to actual train operating data, which system comprises: train simulation means for receiving simulated train control signals, for calculating train responses to the received data, and for generating a visual output communicating the train responses to an operator of the train simulation means; and interface means, connected to the train simulation means, for defining a communication circuit through which actual train operating data are transferable to the train simulation means for use by the train simulation means alternatively to the simulated train control signal.

The interface means of the preferred embodiment interfaces two data entry terminals to a train simulation computer within the train simulation means. The computer includes an output through which a control signal is provided; one of the data entry terminals includes a receive input, a transmit output, and a control output; the other data entry terminal includes a receive input and a transmit output. Within this context, the interface means comprises: first switch means for connecting the receive input of the one data entry terminal to the train simulation computer; second switch means for connecting the transmit output of the one data entry terminal to the train simulation computer; third switch means for connecting the control output of the one data entry terminal to the train simulation computer; means for connecting the output of the train simulation computer to the first, second and third switch means so that the first, second and third switch means are controlled in response to the control signal provided by the train simulation computer through the output thereof; and means for connecting the receive input and the transmit output of the other data entry terminal to the train simulation computer. This interface further comprises: first clock switch means for communicating a first clock signal from the train simulation computer back to the train simulation computer in response to the third switch means; and second clock switch means for communicating a second clock signal from the train simulation computer back to the train simulation computer in response to the control signal from the train simulation computer.

The present invention also provides a method of simulating train responses in a train simulator apparatus in response to actual train operating data, which train simulator apparatus includes an operating program and an operating facility for inputting simulated train operating data used by the operating program to generate a simulation of train responses to the simulated train operating data. This method comprises the steps of: (a) connecting a tangible recording medium to the train simulator apparatus by means of a data transfer circuit, which tangible recording medium includes actual train operating data recorded thereon; (b) transferring the actual train operating data from the tangible recording medium to the train simulator apparatus through the data transfer circuit; and (c) using the transferred actual train operating data, instead of simulated train operating data from the operating facility, to control the operating program to generate a simulation of train responses to the actual train operating data.

Therefore, from the foregoing, it is a general object of the present invention to provide a novel and improved method and apparatus related to simulating train responses to actual train operating data. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of a preferred embodiment of the system of the present invention adapted to respond to digital information recorded on a magnetic storage tape.

FIG. 2 is a block diagram of a system similar to that shown in FIG. 1 but adapted to receive analog information from a magnetic storage tape.

FIG. 3 is a block diagram of external connections made to the interface identified in FIGS. 1 and 2.

FIG. 6 is a flow chart of a new program used in the simulator computer to play a simulation or replication of train responses to the actual train operating data loaded by means of the program shown in FIG. 5.

DETAILED DESCRIPTION OF THE PREFERRED EMBODIMENTS

Figure 4:
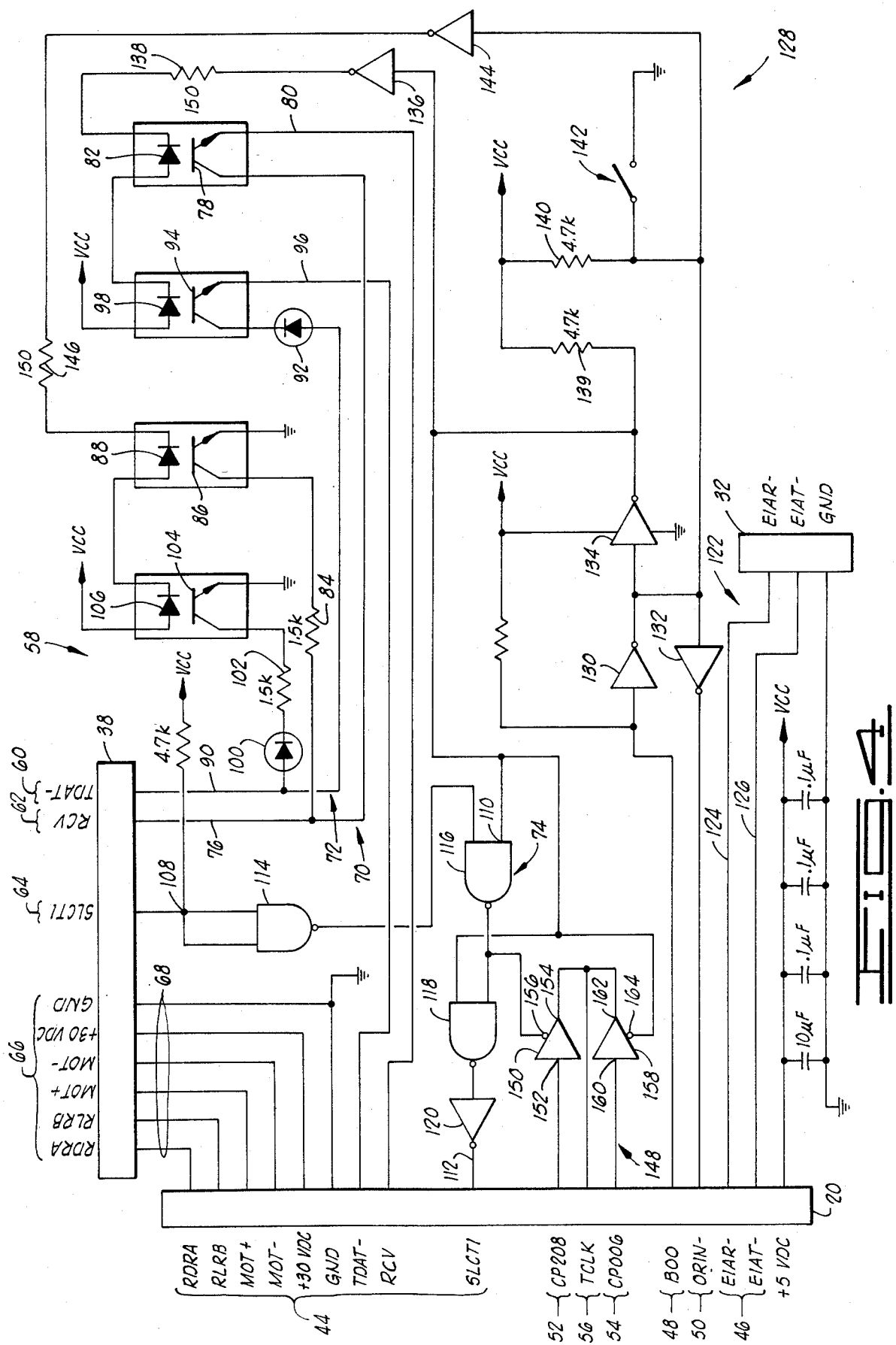
FIG. 4 is a schematic circuit diagram of the preferred embodiment of the interface identified in FIGS. 1-3.

Two preferred embodiments of the overall system of the present invention are represented in the block diagrams of FIGS. 1 and 2. The embodiment shown in FIG. 1 is adapted for obtaining actual train operating data stored in digital format on a magnetic storage tape 1a embodying a particular type of tangible recording medium on which are recorded actual train operating data obtained during movement of an actual train along an actual section of track. The FIG. 2 embodiment is adapted for use with the tangible recording medium 1b having the actual train operating data recorded in analog format.

Both of the systems of FIGS. 1 and 2 include a train simulator apparatus 2 which will be more particularly described hereinbelow. Both also include interface means 4 defining a data transfer circuit through which either manually entered data or automatically entered data can be transferred to the train simulator apparatus 2. Manual data entry is achieved through a manual data entry terminal 6, such as a conventional teletypewriter. The teletypewriter has standard outputs and inputs of types as known to the art and more specifically referred to hereinbelow with reference to FIG. 4. Automatic data entry occurs through an automatic data entry terminal 8a (FIG. 1) or 8b (FIG. 2). Either of these terminals 8a, 8b can be described as defining means for communicating actual train operating data from the tangible recording medium to the interface 4; because the preferred embodiment of the tangible recording medium is a magnetic storage tape, this means can also be referred to as a tape player means for operating a magnetic storage tape on which the actual train operating data are stored so that actual train operating data are converted into digital electrical signals for use by the interface 4.

In the preferred embodiment of FIG. 1, the terminal 8a is implemented by the portable unit of the apparatus disclosed in U.S. Pat. No. 4,561,057, incorporated herein by reference. Before being connected into the system depicted in FIG. 1, this portable unit, sometimes referred to as a data transfer unit (DTU), is used to transfer the actual train operating data from the memory of an on-board unit of the apparatus shown in the '057 patent to the magnetic recording tape 1a after the train has completed its movement along the section of track for which the recorded information is needed. These data have been previously stored in the on-board memory during the actual movement and operation of the train along the section of track.

The terminal 8b represented in FIG. 2 is contemplated to include a suitable analog-to-digital converter and signal conditioning circuit 9 by means of which continuous analog signals can be converted into a suitable digital format for use by the interface 4 of the FIG. 2 embodiment. The embodiment of FIG. 2 is specifically contemplated to be adapted for use with a continuous analog recorder 10 of a type as known to the art. These systems typically utilize a multi-channel, continuous recirculating magnetic tape for the recording medium 1b depicted in FIG. 2. One example of such an analog recorder 10 is a recorder which includes a tape playing unit 12 providing an analog output to drive an oscillograph 14. This type of recorder is marketed by Pulse Electronics Inc. and Aeroquip Corp., for example. In this embodiment the tape playing unit 12 also forms part of the automatic data entry terminal 8b. The analog output from the tape playing unit 12 is, as represented in FIG. 2, connected as an input into the analog-to-digital converter and signal conditiioning circuit 9 of the automatic data entry terminal 8b.

The manual data entry terminal 6 and the automatic data entry terminals 8a, 8b will not be further described other than to note that the output provided by the terminal 6 is of the current loop type and the output of either the terminal 8a or the terminal 8b is of the RS232 type. Both of these are formats known to the art.

The train simulator apparatus 2 defines train simulation means for receiving simulated train control signals, for calculating train responses to the received data, and for generating a visual output communicating the train responses to an operator of the train simulation means.

In the preferred embodiment, the train simulation means is embodied by the simulator which is disclosed in U.S. Pat. No. 4,041,283 incorporated herein by reference and which is commercially available and known as the Train Dynamics Analyzer (see also U.S. Pat. No. 4,042,810, incorporated herein by reference). Such a simulator includes a computer (a Computer Automation, Inc. minicomputer in the preferred embodiment) which contains an operating program and to which an operating facility (such as a mockup locomotive control stand referred to in the '283 patent) is connected. The operating facility is used for inputting simulated train operating data used by the operating program to generate a simulation of train responses to the simulated train operating data in the manner described in the '283 patent.

The operating program of the prior simulator is modified in the present invention, as more particularly described hereinbelow, to allow reception and use of the actual train operating data through the interface 4. This modification includes: means and methodology for transferring the actual train operating data from the tangible recording medium 1a or 1b to the train simulator 2 through the interface 4; means and methodology for calculating in the train simulator apparatus 2 simulator operation data from the transferred actual train operating data; means and methodology for loading the simulator operation data on a suitable medium (e.g., a magnetic tape of the type known in the art as a "Linctape"); and means and methodology for using the transferred actual train operating data, instead of simulated train operating data from the operating facility, to control the operating program to generate a simulation of train responses to the actual train operating data. In the preferred embodiment this usage includes means and methodology for reloading the simulator operation data from the medium back into the train simulator apparatus, and means and methodology for inputting the reloaded simulator operation data into the prior operating program.

In calculating the simulator operation data, the compressed actual train operating data obtained through the interface 4 in the preferred embodiment is expanded to form data in a suitable format for use by the prior operating program. For example, data obtained from the tape 1a are converted (by interpolation in the preferred embodiment) into 1-second segments of information which are understood by the prior operating program of the simulator disclosed in the '283 patent. During playback when these converted data are used, the data appear to the simulator computer as normal input for use by the remainder of the pre-existing operating program of the simulator apparatus 2.

The train simulator apparatus 2, and specifically the computer thereof which does the data handling and calculating, has inputs and outputs defined herein as various "ports" through which communications with the interface 4 are made. In the preferred embodiment the simulator apparatus 2 has a data port with two modes of configuration, one mode for communicating in current loop format and the other mode for communicating in RS232 format. There is a control port through which a control signal is provided. The control signal controls functions within the interface 4, and it is looped back into the simulator apparatus to control in which configuration the data port is operated. The control signal has at any one time either a first logic level (which in the preferred embodiment prevents communications between the manual data entry terminal 6 and the train simulator apparatus 2 and configures the data port to communicate with the automatic data entry terminal) or a second logic level (which in the preferred embodiment enables communications between the simulator apparatus and the manual data entry terminal). The train simulator apparatus 2 also includes two clock output ports: one for providing a timing signal for use with a current loop (e.g., 110 or 300 baud), and the other for providing a timing signal for use with an RS232 circuit (e.g., 9600 baud). The train simulator apparatus 2 includes a clock input port through which a selectable one of these two timing signals from the two clock output ports is input back into the train simulator apparatus 2. These ports will be more particularly identified hereinbelow with reference to the interface means 4.

The interface 4 defines a communication circuit through which the actual train operating data are transferable to the train simulation means 2 for use alternatively to simulated train control signals such as are provided through the mock-up control stand of the preferred embodiment train simulation means described in U.S. Pat. No. 4,041,283. Thus, the interface 4 defines a data transfer circuit through which the actual train operating data are transferred from the magnetic storage tape 1a or 1b to the train simulator computer in the preferred embodiment. In the preferred embodiment, this data transfer circuit allows selection of data in either current loop format or RS232 format.

As indicated in FIG. 3, the interface 4 of the preferred embodiment includes electrical circuitry and components mounted on a single circuit card 16 retained within a container or box 18. The card 16 has a jack 20 which connects to the train simulator computer through a cable 22 extending between a plug 24, connected to the jack 20, and a jack 26, mounted to the container 18. A cable 28 connects the jack 26 to the serial input/output (I/O) port (referred to herein as the data port) of the preferred embodiment train simulation means 2 through a plug 30. The circuit card 16 has a jack 32 connected through a cable 34 to a cable 36 extending from the automatic data entry terminal 8a or 8b. The circuit card 16 has a jack 38 connected through a cable 40 to a cable 42 extending from the manual data entry means 6, which in the preferred embodiment is a teletypewriter terminal.

The jack 20 is more specifically shown in FIG. 4 as including a number of individual contacts or terminals through which connections are made to the train simulator apparatus 2. As previously mentioned, the train simulator apparatus 2 has a data port, specifically, the aforementioned serial I/O port. This port has a current loop section and an RS-232 section, only one of which fully communicates with the simulator computer at any one time.

The current loop section of the data port of the preferred embodiment has eight lines over which communications are made; these are connected to the eight contacts or terminals of the jack 20 collectively identified in FIG. 4 by the reference numeral 44. The RS-232 section of the data port of the simulator 2 has two lines which are connected to the contacts or terminals collectively identified by the reference numeral 46 in FIG. 4. A control port of the simulator 2 is used to communicate a control signal through a contact or terminal 48 of the jack 20. A data port configuration select signal is provided to the simulator 2 through a contact or terminal 50 identified in FIG. 4 as part of the jack 20; this signal selects which of the current loop section and RS-232 section of the serial I/O port communicates with the simulator computer. The train simulator apparatus 2 also has two clock output ports, one of which provides a clocking signal for 110 or 300 baud to a contact or terminal 52 of the jack 20 and the other of which provides a clocking signal for 9600 baud to a contact or terminal 54 of the jack 20. One of these two clocking signals is selected through the interface 4 and communicated back to the train simulator apparatus 2 through a contact or terminal 56 of the jack 20. Each of these ports, as these contacts or terminals of the jack 20 will also be referred to, connect with the corresponding ports of the train simulator apparatus 2 through the multiple conductor cables 22, 28 identified in FIG. 3.

The current loop data port 44 of the jack 20 connects to the jack 38 through connector circuit means 58 for connecting the manual data entry terminal 6 to the data port of the train simulator apparatus 2. This connection is made in part through a switching circuit included within the connector circuit means 58 so that data generated by manual operation of the manual data entry terminal 6 is communicated to the train simulator apparatus 2 when the switching circuit is in one slate of operation and so that data generated by manual operation of the manual date entry terminal 6 is prevented from communication to the train simulator apparatus 2 when the switching circuit is in another state of operation. In the preferred embodiment the connector circuit means 58 provides a current loop circuit means for switchably connecting the teletypewriter to the train simulator apparatus 2.

The teletypewriter which is connected to the jack 38 has input and output ports corresponding to those identified by the labeling associated with the jack 38 shown in FIG. 4. One output port transmits data through a port 60 of the jack 38, and an input port of the teletypewriter receives data through a port 62 of the jack 38. A control signal (indicating, in the preferred embodiment, either a 110 or 300 baud rate) is transmitted from an output of the teletypewriter through a port 64 of the jack 38. The other identified function labeled in FIG. 4 are associated with individual contacts or terminals of the jack 38 collectively referred to as a port 66. These individual contacts or terminals of the port 66 are directly communicated to corresponding ones of the port 44 of the jack 20 through direct electrical conductors collectively identified by the reference numeral 68 shown in FIG. 4. The first three mentioned ports of the jack 38 (namely, ports 60, 62, 64) are connected to corresponding contacts or terminals of the port 44 of the jack 20 through the aforementioned switching circuit of the connector circuit means 58.

The switching circuit of the circuit means 58 specifically includes in the preferred embodiment: a switch means 70 for connecting the receive input port, via the port 62 of the jack 38, of the manual data entry terminal 6 to the train simulator apparatus 2; a switch means 72 for connecting the transmit output port, via the port 60 of the jack 38, of the manula data entry terminal 6 to train simulator apparatus 2; and a switch means 74 for connecting the control output port, via the port 64 of the jack 38, of the data entry terminal 6 to the train simulator apparatus 2.

The switch means 70 includes a conductor 76 connected to a collector of a photo-responsive transistor 78 which has an emitter connected through a conductor 80 to the respective contact of the port 44 of the jack 20. Optically associated with the base of the transistor 78 is a photodiode 82 disposed near the photo-responsive transistor 78 so that when the diode 82 is illuminated, the transistor 78 is driven to saturation. The switch means 70 also includes a resistor 84 interconnecting the conductor 76 to the collector of a photo-responsive transistor 86 having its emitter connected to electrical ground. A photodiode 88 is associated with the transistor 86. The illumination of the diodes 82, 88, and thus the operation of the switch means 70, is controlled in response to the control signal provided from the train simulator apparatus 2 through the port 48 of the jack 20 as subsequently described hereinbelow.

The switch means 72 is constructed similarly to the switch means 70. In particular, the switch means 72 includes a conductor 90 connected through a light emitting diode 92 to the collector of a photo-responsive transistor 94 having its emitter connected to a conductor 96. The other end of the conductor 96 is connected to the respective contact or terminal of the port 44 of the jack 20 shown in FIG. 4. Disposed in operative association with the transistor 94 is a photodiode 98 having its anode connected to the operating voltage supply and having its cathode connected to the anode of the diode 82 so that the diodes 82, 98 are connected in electrical series with each other. The switch means 72 also includes a light emitting diode 100 which, with a serially connected resistor 102, connects the conductor 90 to the collector of a photo-responsive transistor 104 having its emitter connected to electrical ground. Associated with the transistor 104 is a photodiode 106 having its anode connected to the system voltage supply and having its cathode connected to the anode of the diode 88 so that the diodes 88, 106 are connected in electrical series.

The switch means 74 of the preferred embodiment broadly includes combinational logic means comprising: an input 108 connected through the port 64 of the jack 38 to the manual data entry terminal 6; an input 110 connected to a control circuit means subsequently described hereinbelow; and an output 112 connected to the respective input of the serial I/O data port of the train simulator apparatus 2 through the contact or terminal of the port 44 of the jack 20 shown in FIG. 4. This combinational logic means communicates a signal received through the input 108 to the data port of the train simulator apparatus 2 in response to a control signal from the control circuit means enabling the combinational logic means. The combinational logic means also generates a clock select signal in response to the signal received through the input 108 and in response to the control signal received through the input 110.

In the preferred embodiment this combinational logic means includes two combinational logic gate means. One of the logic gate means includes a logic inverter (defined in the preferred embodiment of FIG. 4 by a NAND gate 114) and a NAND gate 116 having one input connected to the output of the NAND gate 114 and having its other input defining the input 110. The other logic gate means includes a NAND gate 118 having an input connected to the output of the NAND gate 116 and having another input connected to receive the same signal applied to the input 110 of the NAND gate 116. This other logic gate means also includes an inverter 120 connected between the output of the NAND gate 118 and the identified contact or terminal of the jack 20. The operation of these elements will be subsequently described hereinbelow.

The RS-232 section of the data port of the train simulator apparatus 2 communicated through the port 46 of the jack 20 is connected to corresponding contacts or terminals of the jack 32 as shown in FIG. 4. The "EIAR-" contact or terminal of the jack 32 connects to a receive input of the automatic data entry terminal 8a or 8b, and the "EIAT-" contact or terminal of the jack 32 connects to a transmit output of the automatic data entry terminal 8a or 8b in the preferred embodiment. These contacts or terminals of the jack 32 are connected to the correspondingly labeled contacts or terminals of the port 46 of the jack 20 through connector circuit means 122 for connecting the automatic data entry terminal to the appropriate section of the data port of the train simulator apparatus 2 so that the actual train operating data are communicated to the train simulator apparatus 2 from the automatic data entry terminal 8a or 8b. In the preferred embodiment the connector circuit means 122 includes a conductor 124 and a conductor 126 connected as shown in FIG. 4. The conductors 124, 126 connect the receive input and the transmit output, respectively, of the data entry terminal 8a or 8b to the train simulator apparatus 2.

Connected to the control port 48 of the jack 20 is the aforementioned control circuit means generally identified by the reference numeral 128 in FIG. 4. The circuit 128 is connected between the control port of the train simulator apparatus 2 when that port is connected to the port 48 of the jack 20, and the circuit 128 is also connected to the switching circuit of the connector circuit means 58. The control circuit 128 controls the state of operation of the switching circuit in response to the control signal transmitted by the train simulator apparatus 2 through its control port and the corresponding port 48 of the jack 20. As shown in FIG. 4, the circuit 128 specifically connects this control output to the three switch means 70, 72, 74 and, more specifically, to the photodiodes 82, 98 and 88, 106 and to the input 110 to control the switchable operation of these portions of the current loop interface between the jacks 20, 38.

The preferred embodiment of the circuit 128 includes an inverter logic gate 130 having its input connected to the port 48 and having its output connected to an inverter logic gate 132, the output of which is connected to the data port configuration select port 50 of the jack 20.

The output of the gate 130 is also connected to the input of an inverter logic gate 134, the output of which is connected to the input 110 of the logic gate 116 and to the respective input of the logic gate 118 shown in FIG. 4. The output of the inverter logic gate 134 is also connected to the input of an inverter logic gate 136 whose output is connected through a resistor 138 to the cathode of the photodiode 82. The output of the inverter logic gate 134 is also connected to a pull-up resistor 139.

The output of the inverter logic gate 130 is also connected to a pull-up resistor, identified by the reference numeral 140. This output is also connected to a switch 142 which pulls and holds the output of the inverter gate 130 to electrical ground when the switch element is in a closed position for the configuration shown in FIG. 4.

The output of the inverter logic gate 130 is connected to the input of an inverter logic gate 144. The output of the gate 144 is connected through a resistor 146 to the cathode of the photodiode 88.

The ports 52, 54 of the jack 20, which ports are for connecting to respective clock output ports of the train simulator apparatus 2, are selectably connected to the port 56, and thus to clock input port of the train simulator apparatus 2, by a clock select circuit means 148 shown in FIG. 4. The clock select circuit means 148 operates in response to at least the control signal transmitted through the port 48 of the jack 20. The circuit means 148 specifically includes two clock switch means: one for communicating its respective clock signal from the train simulator apparatus 2 back to the train simulator apparatus 2 in response to operation of the third switch means 74, and the other for communicating its clock signal from the train simulator apparatus 2 back to the simulator 2 in response to the control signal transmitted from the simulator 2 through the port 48. The former clock switch means is defined in the preferred embodiment of FIG. 4 by a buffer logic gate switch 150 having an input terminal 152 connected to the port 52, having an output terminal 154 connected to the port 56, and having a control terminal 156 connected to the switch means 74 (specifically, the output of the NAND gate 116 so that the gate switch 150 is controlled by this signal generated within the switch means 74). The latter clock switch means includes a buffer logic gate switch 158 having an input terminal 160 connected to the port 54, having an output terminal 162 connected in common with the output 154 of the gate 150 to the port 56, and having a control terminal 164 connected to the control circuit means 128 (specifically the output of the logic gate 134 so that the gate switch 158 is controlled by the control signal communicated from the train simulator apparatus 2 through the port 48 of the jack 20).

The specific components comprising the overall circuit shown in FIG. 4 are of suitable types as known to the art. For those specifically shown in FIG. 4, they define the circuit so that a low logic level applied to the port 48 of the jack 20 prevents the current loop ports 60, 62, 64 from communicating with the train simulator apparatus 2. Such communication is allowed in response to a high logic level control signal provided to the port 48 from the train simulator apparatus 2.

When the low logic level control signal is applied to the port 48, this causes the output of the logic gate 134 to also be at a low logic level. This output switches the clock switch gate 158 on (effecting a switch closure) so that the timing signal provided through the port 54 is communicated back to the train simulator apparatus 2 through the port 56. The clock switch gate 150 is deactivated (effecting a switch opening) at this time because the output of the NAND gate 116 is forced to a high logic level in response to the low logic level existing at the input 110, thereby making the logic level at the other input of the NAND gate 116 irrelevant. The low logic level at the output of the inverter gate 134 also prevents the photodiodes 82, 98 from illuminating which maintains the transistors 78, 94 in an off (switch open) condition or state thereby effectively disconnecting the port 60, 62 from the respective ports of the jack 20 and thus the simulator 2. Furthermore, the conductors 76, 90 from the ports 62, 60, respectively, are pulled to system ground through the transistors 86, 104, respectively, which are driven to saturation by the illumination of the diodes 88, 106 resulting from a low output of the inverter logic gate 144 driven to that state by the high logic level at the output of the inverter logic gate 130. This pulling to ground through the transistor 104 illuminates the diode 100 to indicate the resultant "switch open" state of the switch means 70, 72. Such a low logic level control signal at the port 48 is also communicated back to the simulator 2 through the logic gates 130, 132 and the port 50 to cause the data port of the simulator 2 to be in its RS-232 configuration so that communications with the automatic data entry means 8a or 8b can occur.

When a high logic level control signal is provided through the port 48 of the jack 20, the data port of the simulator 2 is configured for current loop communication. When such a high logic level control signal is provided through the port 48, the states of the diodes 82, 98 and 88, 106 are reversed so that the diodes 82, 98 illuminate to drive the transistors 78, 94 to saturation, and so that the diodes 88, 106 are not illuminated whereby the transistors 86, 104 are switched off. This "switch closed" state of both of the switch means 70, 72 allows data to be received by and transmitted from the manual data entry terminal 6 through the port 62, 60. Transmissions of data from the manual data entry terminal 6 during this state of operation are indicated by illumination of the light-emitting diode 92. Also, this time, the clock switch gate 158 is switched off and the clock switch gate 150 becomes responsive to the state of the control signal transmitted from the manual data entry terminal 6 through the port 64 of the jack 38. That is, when the control signal from the manual data entry terminal 6 is at a low logic level, this causes a low logic level output from the NAND logic gate 116, which low logic level output actuates (switches "on") the clock gate switch 150 to communicate the timing signal applied to the port 52 to the port 56. When the control signal transmitted through the port 64 is at a high logic level, this high logic level is transferred to the output of the gate 116 so that the clock gate switch 150 is deactivated (switched "off"). The level of this output signal from the gate 116 is communicated through the combination of logic gates 118, 120 for application to the respective terminal of the port 44 of the jack 20.

Regardless of the state of the control signal applied to the port 48 for the simulator 2, operative communication paths between the port 44 and the ports 60, 62, 64 are established whenever the manual switch 142 is closed because this switch closure condition forces the switch circuits 70, 72, 74 to operate as if a high logic level signal were applied to the port 48 of the jack 20. Closure of the switch 142 also causes the data port of the simulator 2 to be configured for current loop communications.

Figure 5:
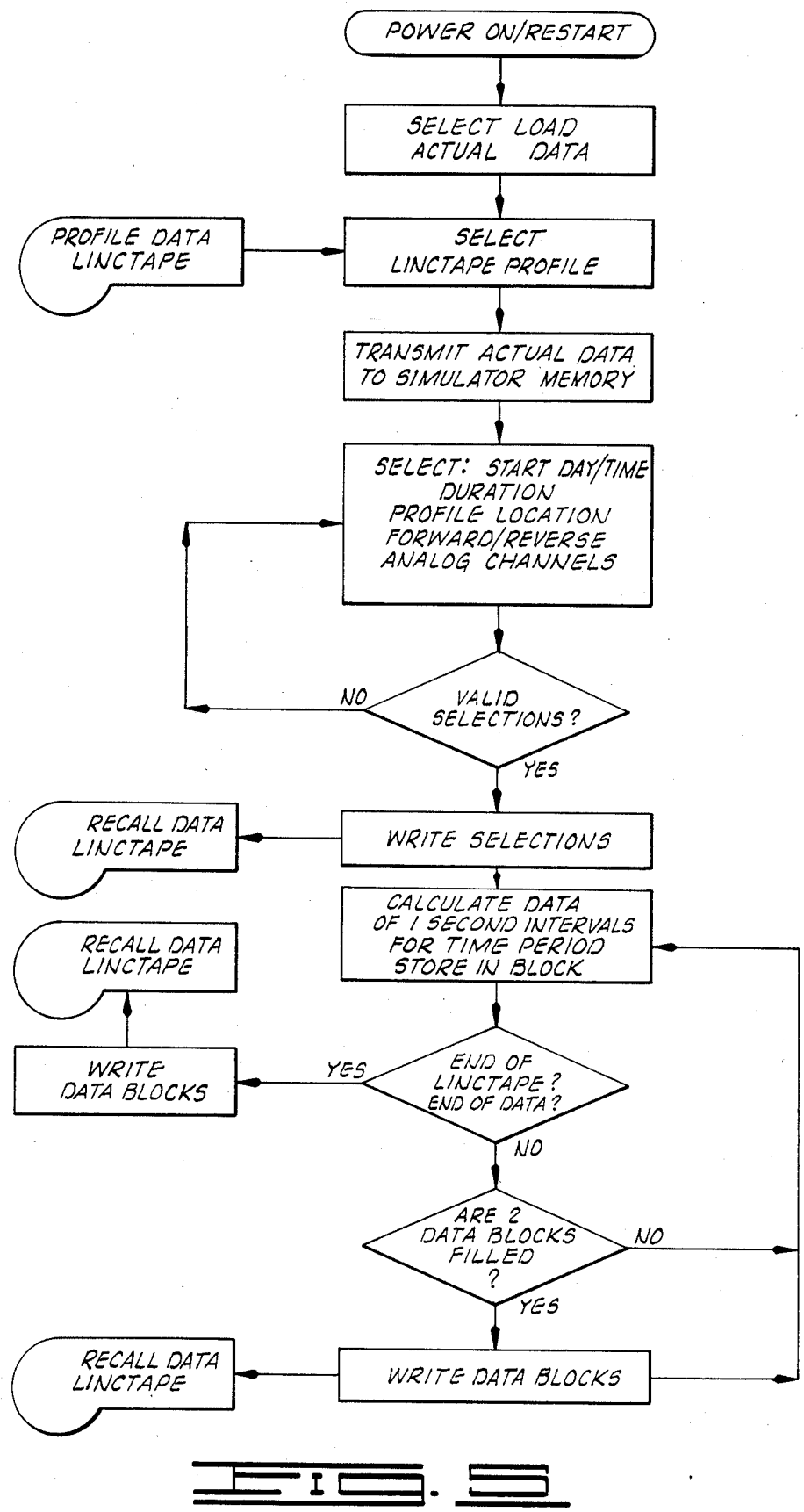
FIG. 5 is a flow chart of a new program used in a computer of the train simulator to load actual train operating data from a storage tape into the simulator computer, to process and format the data and to transfer the processed and formatted data to the train simulator's storage tape.

The new software added to the train simulator apparatus 2 of the preferred embodiment is disclosed in the flow charts of FIGS. 5 and 6. This software is stored in the train simulator apparatus because the apparatus 2 is the means by which communication with either the manual data entry terminal 6 or the automatic data entry terminal 8a or 8b is controlled. The program disclosed in FIGS. 5 and 6 pertain to communications made with the manual data entry terminal 6 and the automatic data entry terminal 8a or 8b through the interface 4 (i.e., the data loading program depicted in FIG. 5) and to playback of this data to create simulations or replications of the train responses based on the actual train operating data obtained from the loading operation (which playback is performed under control of the program depicted in FIG. 6).

Besides the two programs depicted in FIGS. 5 and 6, an additional new capability added to the train simulator apparatus 2 for use with the combination of elements of the present invention is the capability of transferring data from the automatic data entry terminal 8a to a printer simply by using memory of the train simulator apparatus 2 as a buffer. This additional feature is not necessary to, and is distinct from, the present invention concerned with obtaining actual train operating data for use in recreating or simulating train responses to such actual data; therefore, this printing capability will not be further described.

When first turning on the system of the present invention, the following six-item menu appears through the display screen of the train simulator apparatus 2:

1—STANDARD SIMULATION
2—RECORD SIMULATION
3—RECALL SIMULATION
4—CONSIST PREPARATION
5—LOAD SDA/DTU DATA
6—PRINT SDA/DTU DATA

["SDA/DTU" refers to a specific implementation of the present invention using the FreightMaster SDA system and its data transfer unit, DTU, such as described in U.S. Pat. No. 4,561,057 and/or U.S. patent application Ser. No. 901,212 filed Aug. 28, 1986, both of which are incorporated herein by reference]

Items 1, 2, 3 and 4 are functions which are known and part of the pre-existing train simulation apparatus 2 of the preferred embodiment, namely the one described in U.S. Pat. No. 4,041,283; except that item 3 is modified to operate as described hereinbelow with reference to FIG. 6 when the data recalled are those from the actual train operating data rather than from the simulated data generated through the mockup control stand of the simulator 2. Item 6 pertains to the aforementioned new feature of using the train simulator apparatus to print data from the preferred embodiment of the automatic data entry terminal 8a to a printer. Item 5 pertains to the loading program shown in FIG. 5.

Generally, item 5 is selected when the actual train operating data are to be loaded from the automatic data entry terminal 8a or 8b into the train simulator apparatus 2 for ultimate storage on a suitable magnetic tape, such as one referred to as "Linctape" from Digital Equipment Corporation. For clarity, this tape will be referred to as the simulator tape or by the name "Linctape" as distinguished from the tape 1a or 1b from which the actual train operating data are retrieved. During this loading operation, certain variables are entered through the manual data entry terminal 6, namely the teletypewriter in the preferred embodiment. These variables include the track profile, the absolute starting location of the train along the track profile, the absolute start time, the duration of the run, the forward or reverse position of the locomotive, and the assignment of analog channels to the respective inputs. There is also entered a flag for storage on the simulator tape so that when the simulator tape is played back the computer of the train simulator apparatus 2 will know whether the data played back are simulated data or actual train operating data. With these variables having been entered, the actual train operating data including speed, distance, time, throttle position, brake pipe, equalizer pressure, dynamic brake, reverse/forward direction of movement, sand and brake cylinder information are transferred, using known RS-232 communications controls, from the automatic data entry terminal 8a or 8b into the computer of the train simulator apparatus 2 for use by the computer in calculating onesecond segments of data to be used in determining the train responses during playback. This calculating is needed to expand, by linear interpolation in the preferred embodiment, the data which have been stored in a compressed form on the tape 1a or 1b.

More specifically, for the implementation of the present invention including the FreightMaster Train Dynamics Analyzer (TDA) (U.S. Pat. No. 4,041,283) and the data transfer unit (DTU) of the FreightMaster SDA system (U.S. Pat. No. 4,561,057 and U.S. patent application Ser. No. 901,212), when item 5 is selected, the following message will appear on the display screen:

```
         MOUNT/ENABLE RECORD TAPE
         PRESS CONTINUE
```

Do not press CONTINUE on the TDA until the following steps have been completed on the DTU:
1. Load the tape data on the DTU (TAPE LOAD and CONTINUE)
2. Select TRANSFER DATA TO TDA? (:7)

After these two steps have been completed, the following message will appear on the screen:

```
SELECT:
    1. PROFILE1
    2. PROFILE2
    3. PROFILE3
    4. PROFILE4
```

After the profile has been selected, the following message will be displayed:

```
                    LOADING SDA/DTU DATA
         PRESS CONTINUE on the DTU
```

After the data have been loaded into the TDA, the following message will be displayed:

TELETYPE RESPONSE REQUIRED

After a short pause, these lines will appear on the teletypewriter:

```
DATA START DATE/TIME:    (date)    (time)
DATA STOP DATE/TIME:     (date)    (time)
         TOTAL TIME               (total time)
```

This information should correspond to a data summary presented by the DTU, and it is derived from the data on the DTU tape.

The next line requires a response:

```
START DAY/TIME:  (day/time printed, as above) (the
                 pointer is then here to receive a
                 different day/time via teletype-
                 writer entry)
```

If the same START DAY/TIME is wanted, press RETURN:

START DAY/TIME:  (day/time) (RETURN)

If a different START DAY/TIME is wanted, type in the new day/time (XX/XX:XX:XX) and press RETURN:

```
START DAY/TIME:   (day/time)
    XX/XX:XX:XX (RETURN)
```

An entry which is smaller than the START DAY/TIME or larger than the STOP DAY/TIME generates an error. An entry with invalid characters generates an error. If an error is present, the teletypewriter prints the same line and waits for a response:

```
START DAY/TIME:   (day/time) (the pointer is
    here)
```

The next entry on the teletypewriter is:

```
DURATION DAY(S)/TIME:   (day(s)/time
    printed, from TOTAL TIME above) (the pointer
    is here)
```

If the same DURATION DAY(S)/TIME is wanted, press RETURN:

```
DURATION DAY(S)/TIME:   (day(s)/time)
    (RETURN)
```

If a different DURATION DAY(S)/TIME is wanted type the new data and RETURN

```
DURATION DAY(S)/TIME: (day(s)/time) XX/XX:XX:XX
                                         (RETURN)
```

If the START DAY/TIME+DURATION DAY(S) TIME is greater than the STOP DAY/TIME an error is generated. An invalid character generates an error. If an error is generated, the teletypewriter prints the same line and waits for a response:

```
DURATION DAY(S)/TIME: (day(s)/time) (the
    pointer is here)
```

If the DURATION DAY(S)/TIME is valid, the teletypewriter prints the following information for the start time and the total or end time:

```
DATE    TIME    DT    MPH    MILE
```

The first line of entries shows the starting date and time, the starting elapsed time, the starting speed, and the starting mileage. The second line shows the end data and time, the total elapsed time, the ending speed, and the total mileage during the elapsed time.

The next line printed by the teletypewriter requires a response:

```
MILEPOST.FRACTION:   0.0000 (the pointer is
    here)
```

At the start of the program, the desired profile was selected. The exact location of the profile corresponding to the START DAY/TIME must be entered.

If the same MILEPOST.FRACTION is wanted, press RETURN:

MILEPOST.FRACTION:   0.0000 (RETURN)

If a different MILEPOST.FRACTION is wanted, type the data and RETURN:

---
MILEPOST.FRACTION:  0.0000   XXX.XXXX (RETURN)
---

No more than four values are permitted behind the decimal point. An entry with invalid characters generates an error. If an error is present, the teletypewriter prints the same line and waits for a response.

If a milepost is selected which is outside the range of mileposts in the profile, no error is generated. At playback time, the simulation program will search for the milepost in the selected profile and will start simulation approximately 5 miles from the first location in the profile if no valid milepost selection has been made. It is the user's responsibility to select a valid milepost.

When the milepost has been selected, the next three lines on the teletypewriter are:

---
CAB POSITION:
1 - FORWARD
2 - REVERSE (The pointer is here.)
---

This selection determines if the locomotive is facing forward or backward with respect to the rest of the consist. Type:

X (i.e., either "1" or "2," RETURN is automatic.)

If an invalid character is pressed, the teletypewriter will prompt:

---
CAB POSITION:
1 - FORWARD
2 - REVERSE (The pointer is here.)
---

If a response is accepted by the teletypewriter, the next query is:

---
ANALOG DATA     CHANNEL   CHANNEL
DYNAMIC BRAKE      0      ENTER: (The pointer is here.)
---

If the same channel is wanted, press RETURN:

---
DYNAMIC BRAKE - 0   ENTER: (RETURN)
---

If a different channel is wanted, type the different channel number:

---
DYNAMIC BRAKE - 0   ENTER: X
--- where X is the new channel number. If a channel less than 0 or greater than 7 is selected, an error is generated. If an error is generated, the teletypewriter prints the same line and waits for a response:

---
DYNAMIC BRAKE - 0   ENTER: (The pointer is here.)
---

The same procedure is followed for the next three analog selectionsl

---
CYLINDER - 1
BRAKE PIPE - 2
EQUALIZER - 3
---

If a response is accepted by the teletypewriter, the last query is:

---
VALID ENTRY:
1 - YES
2 - NO
(The pointer is here.)

Type:
VALID ENTRY:
---

---
1 - YES
2 - NO
X (RETURN is automatic.)
---

If all the previous data entries are correct, select "1" (YES). If information is to be changed, select "2" (NO).

If "2" (N0) is selected, the teletypewriter will begin with the START DAY/TIME query, and proceed through all questions again.

If "1" (YES) is selected, the record tape (the simulator tape) will begin moving. The time required to write to the simulator depends on the DURATION DAY(S)-/TIME input. The maximum time which can be recorded on linctape is 4½ hours.

The scree display will be:

PAUSE FOR TAPE OPERATION

When the recording has been completed, the message displayed on the screen will be:

---
DATA RECORDED/NO ERRORS
PRESS CONTINUE
or
TAPE END/TIME (DD/HH:MM:SS)
PRESS CONTINUE
---

If the "TAPE END" message is displayed, the maximum amount of data has been stored on tape. If the first message is displayed, all data have been written to tape. The program returns to the first frame of the simulation menu selection.

Item 3, RECALL SIMULATION, is used to playback the data for simulation or replication of train responses to the actual train operating data which have been previously stored on the simulator tape through use of the load function previously described. At the time of playback, the manual data entry terminal 6 is again used to enter variables. These variables include defining the consist (that is, the configuration of the train to be simulated or replicated), the adhesion (e.g., a wet, dry, sanded), and the brake pipe leakage (with suitable sensing equipment, these last two variables could be detected on-board and stored in the SDA/DTU as part of the actual train operating data). During simulation, the computer of the train simulator apparatus 2 uses the throttle position and speed data to calculate the tractive effort based on pre-digitized locomotive performance data taken from standard specifications for the selected consist. The computer uses the absolute starting train location and the relative distance measurements with the pre-digitized track profile to determine grade and curvature retarding forces. The recorded brake pipe, brake cylinder and speed information are used by the computer along with the train makeup for calculating brake retardation and rolling resistance forces. These computations are made and used in the standard simulation technique of the preferred embodiment of the train simulator apparatus 2 to create displays communicated through the display screen to the operator.

For the flow chart of the playback program shown in FIG. 6, if this feature is selected and the recorded data are actual train operating data loaded from the automatic data entry terminal 1a or 8b (as indicated by the flag which was set during the loading process), the following appear after the information indicated in FIG. 6 has been loaded into the computer of the simulator 2.

---
SELECT:
1 - SIMULATE FORCE
2 - SIMULATE BRAKE
---

If either selection is chosen, the next frame will appear as:

---
SELECT CONSIST:
1. TRN1
2. TRN2
3. TRN3
4. TRN4
---

It is the operator's responsiblity to prepare a consist which closely resembles the consist which was used during the run while the actual train operating data were being initially recorded.

During playback of the simulation based on the actual train operating data, the following options are permitted:

1. Scan Forward/Scan Reverse

The scan feature permits rapid reading of simulator tape data. Time, throttle position, gauges, and distance are modified according to simulator tape data. Scan forward moves the simulator tape forward; scan reverse moves the simulator tape backwards. The speed at which the scan proceeds is based upon the time factor.

2. Nearest Milepost/Next Milepost

If the user desires, the consist may be moved to the nearest milepost or next milepost without reading the simulator tape data.

3. Speed Limit

The speed limit may be reset as needed during DTU playback.

4. Final Summary
5. Time Factor
6. Adhesion
7. Leakage Rate
8. Milepost Direction
9. Consist Display
10. Reset Time The total time of playback is reset and all values used are initialized, but the time corresponding to the actual time of operation for what is being shown on the display screen is not reset.

From the above discussion, it should be apparent that the simulation uses a combination of measured information and theoretical information in order to recreate a simulation of a actual train run. Possible errors which may be generated due to this include:

1. The actual locomotives may be more or less efficient than the pre-digitized locomotive performance data. These data are normally based on theoretical curves originating from the manufacturer. The actual locomotives might not be loading properly.

2. The train makeup provided by the operator might not agree with the actual train makeup (journal or roller bearings, length, tonnage, brake ratio, composition, brake shoe type).

3. The operator might not know the starting profile location and the simulated train location would then be slightly out of synchronization with the actual train. This will affect the grade retardation forces.

The system can detect that a potential error exists and provide the operator with a relative magnitude of the error. By comparing the acceleration as calculated during the simulation with the acceleration actually measured on-board the train while it was operating, a net difference in resistive forces in the train can be estimated. This force is kilopounds (klb) is displayed immediately below the acceleration on the display screen of the simulator apparatus 2.

The simulator operator should observe this force during the playback. If, for example, this number was +15, then the actual drawbar forces displayed on the screen may be as much as 15,000 pounds too high. Conversely, if this number is −15, then the actual drawbar forces displayed on the screen may be as much as 15,000 pounds too low. Ideally, if the train makeup, track location, and locomotive performance were precisely known, this number would be zero. Unfortunately, real life situations are not always ideal; brakes stick, locomotives do not load properly, and true rolling resistance may differ significantly from theoretical formulas.

An experienced operator can use this number to make judgments. For example, if this number is consistently large and positive during most of the playback when the locomotives are in power, then there is a good possibility that the locomotives as programmed are too efficient. The locomotive efficiency should be reduced and the playback rerun. Conversely, if the number is consistently large and negative during power situations, the locomotive efficiency should be increased. If a large positive number occurs only when air brakes are applied, then the train being simulated does not have sufficient braking. The operator may need to increase the brake ratio of the cars in the consist. Conversely, if air brakes result in a large negative number, the brake ratio should be reduced.

In general, if this number stays within the range of ±15 klb (15,000 lb) throughout the playback, then the simulation can be considered reasonably accurate.

Through the development of the new interface 4 and the software depicted in FIGS. 5 and 6 in combination with a known train simulation apparatus 2, a known manual data entry terminal 6 and a known or new automatic data entry terminal 8a or 8b, the present invention provides a novel and improved method and apparatus related to simulating train responses to actual train operating data. Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of simulating train responses in a train simulator apparatus in response to actual train operating data, which train simulator apparatus includes an operating program and an operating facility for inputting simulated train operating data into the train simulator apparatus for use by the operating program thereof to generate a simulation of train responses to the simulated train operating data, said method comprising the steps of:
   (a) recording on a tangible recording medium separate from the train simulator apparatus actual train operating data obtained during movement of an actual train along an actual section of track;
   (b) connecting the tangible recording medium to the train simulator apparatus by means of a data transfer circuit;
   (c) transferring the actual train operating data from the tangible recording medium to the train simulator apparatus through the data transfer circuit; and
   (d) using the transferred actual train operating data, instead of simulated train operating data from the operating facility, to control the operating program to generate a simulation of train responses to the actual train operating data.

2. A method as defined in claim 1, wherein said step or recording includes:
   storing the actual train operating data in a memory located on-broad the train during movement of the train along the section of track; and
   transferring the actual train operating data from the memory to a magnetic recording tape connected to the memory after the train has moved along the section of track, which magnetic recording tape defines the tangible recording medium.

3. A method of simulating train responses in a train simulator apparatus in response to actual train operating data, which train simulator apparatus includes an operating program and an operating facility for inputting simulated train operating data into the train simulator apparatus for use by the operating program thereof to generate a simulation of train responses to the simulated train operating data, said method comprising the steps of:
   (a) connecting a tangible recording medium to the train simulator apparatus by means of a data transfer circuit, which tangible recording medium includes actual train operating data recorded thereon;
   (b) transferring the actual train operating data from the tangible recording medium to the train simulator apparatus through the data transfer circuit;
   (c) using the transferred actual train operating data, instead of simulated train operating data from the operating facility, to control the operating program to generate a simulation of train responses to the actual train operating data;
   (d) connecting a receive data line and a transmit data line of a teletypewriter through respective switches of the data transfer circuit to the train simulator apparatus, each of which switches includes a control input by which the open or closed state of the switch is selected;
   (e) connecting the control input of each of the switches to the train simulator apparatus; and
   (f) entering variable data into the train simulator apparatus from the teletypewriter when the train simulator apparatus operates the switches to connect the receive data line and the transmit data line to the train simulator apparatus.

4. A method of simulating train responses in a train simulator apparatus in response to actual train operating data, which train simulator apparatus includes an operating program and an operating facility for inputting simulated train operating data into the train simulator apparatus for use by the operating program thereof to generate a simulation of train responses to the simulated train operating data, said method comprising the steps of:
   (a) connecting a tangible recording medium to the train simulator apparatus by means of a data transfer circuit, which tangible recording medium includes actual train operating data recorded thereon;
   (b) transferring the actual train operating data from the tangible recording medium to the train simulator apparatus through the data transfer circuit;
   (c) calculating in the train simulator apparatus simulator operation data from the transferred train operating data;
   (d) loading the simulator operation data on a magnetic tape; and
   (e) using the transferred actual train operating data, instead of simulated train operating data from the operating facility, to control the operating program to generate a simulation of train responses to the actual train operating data, said step (e) including the steps of:
   reloading the simulator operation data from the magnetic tape into the train simulator apparatus; and
   inputting the reloaded simulator operation data into the operating program.

5. A method as defined in claim 4, further comprising the steps of:
   selecting track profile data;
   selecting time data;
   selecting train starting location data;
   selecting train direction data; and
   selecting analog channel data; and
   loading the selected data on the magnetic tape on which the simulator operation data is loaded.

6. A system for simulating train responses to actual train operating data, said system comprising:
   train simulation means for receiving data including simulated train control signals, for calculating train responses to the received data, and for generating a visual output communicating the train responses to an operator of said train simulation means;
   interface means, connected to said train simulation means, for defining a communication circuit through which actual train operating data are transferable to said train simulation means as at least part of the data received by said train simulation means so that said train simulation means calculates train responses to the actual train operating data and generates a visual output in response thereto; and wherein:
   said train simulation means includes:

a data port; and a control port; and said interface means includes:

first connector circuit means, including a switching circuit, for connecting a manual data entry terminal to said data port through said switching circuit so that data generated by manual operating of the manual data entry terminal is prevented from communication to said train simulation means when said switching circuit is in a first state of operation and so that data generated by manual operation of the manual data entry terminal is communicated to said train simulation means when said switching circuit is in a second state of operation;

control circuit means, connected to said control port and said switching circuit, for controlling the state of operation of said switching circuit in response to a control signal transmitted by said train simulation means through said control port; and second connector circuit means for connecting an automatic data entry terminal to said data port so that the actual train operating data are communicated to said train simulation means from the automatic data entry terminal.

7. A system as defined in claim 6, wherein:

said train simulation means further includes:

a first clock output port for outputting a first timing signal;

a second clock output port for outputting a second timing signal; and a clock input port for inputting a selected one of said first and second timing signals; and said interface means further includes clock select circuit means for connecting a selectable one of said first clock output port and said second clock output port to said clock input port in response to at least the control signal transmitted through said control port.

8. A system as defined in claim 7, wherein said clock select circuit means includes:

a first logic gate switch through which said first clock output port and said first timing signal are selectably connected to said clock input port, including:

an input terminal connected to said first clock output port;

an output terminal connected to said clock input port; and a control terminal connected to said switching circuit so that said first logic gate switch is controlled by a signal generated in said switching circuit; and a second logic gate switch through which said second clock output port and said second timing signal are selectably connected to said clock input port, including:

an input terminal connected to said second clock output port;

an output terminal connected to said clock input port; and a control terminal connected to said control circuit means so that said second logic gate switch is controlled by said control signal.

9. A system as defined in claim 6, wherein said switching circuit includes:

a first photo-responsive transistor through which data from said train simulation means is switchably communicated to the manual data entry terminal, said first photo-responsive transistor connected in a first conductive path of said first connector circuit means between the manual data entry terminal and said data port;

a second photo-responsive transistor through which data from the manual data entry terminal is switchably communicated to said train simulation means, said second photo-responsive connected in a second conductive path of said first connector circuit means between the manual data entry terminal and said data port; and photo means, connected to said control circuit means, for actuating said first and second photo-responsive transistors in response to said control signal.

10. A system as defined in claim 9, wherein said switching circuit further includes combinational logic means, including one input connected to the manual data entry terminal and another input connected to said control circuit means and an output connected to said data port, for communicating a signal received through said one input to said data port in response to said control signal enabling said combinational logic means and for generating a clock select signal in response to the signal received through said one input and in response to said control signal.

11. A system as defined in claim 10, wherein:

said train simulation means further includes:

a first clock output port for outputting a first timing signal;

a second clock output port for outputting a second timing signal; and a clock input port for inputting a selected one of said first and second timing signals; and said interface means further includes:

a first logic gate switch through which said first clock output port and said first timing signal are selectably connected to said clock input port, including:

an input terminal connected to said first clock output port;

an output terminal connected to said clock input port; and a control terminal connected to said combinational logic means so that said clock select signal controls the state of operation of said first logic gate switch; and a second logic gate switch through which said second clock output port and said second timing signal are selectably connected to said clock input port, including:

an input terminal connected to said second clock output port;

an output terminal connected to said clock input port; and a control terminal connected to said control circuit means so that said control signal controls the state of operation of said second logic gate switch.

12. A system for simulating train responses to actual train operating data, said system comprising:

train simulation means for receiving data including simulated train control signals, for calculating train responses to the received data, and for generating a visual output communicating the train responses to an operator of said train simulation means;

a teletypewriter;

tape player means for operating a magnetic storage tape on which the actual train operating data are stored so that the actual train operating data are converted into digital electrical signals; and interface means, connected to said train simulation means, for defining a communication circuit through which actual train operating data are transferable to said train simulation means as at least part of the data received by said train simulation means so that said train simulation means calculates train responses to the actual train operating data and generates a visual output in response thereto, said interface means including:

current loop circuit means for switchably connecting said teletypewriter to said train simulation means;

means for connecting said tape player means to said train simulation means; and means, responsive to said train simulation means, for controlling the switchable operation of said current loop means.

13. A system as defined in claim 12, wherein:

said train simulation means includes a data port through which data from said teletypewriter and said tape player means is selectably received by said train simulation means; and said interface means further includes means, responsive to said train simulation mans, for controlling said data port to select which data from said teletypewriter and said tape player means is received by said train simulation means.

14. An apparatus for interfacing two data entry terminals to a train simulation computer which includes an output through which a control signal is provided, one of which data entry terminals includes a receive input, a transmit output, and a control output and the other of which data entry terminals includes a receive input and a transmit output, said apparatus comprising:

first switch means for connecting the receive input of the one data entry terminal to the train simulation computer;

second switch means for connecting the transmit output of the one data entry terminal to the train simulation computer;

third switch means for connecting the control output of the data entry terminal to the train simulation computer;

means for connecting the output of the train simulation computer to said first, second and third switch means so that said first, second and third switch means are controlled in response to the control signal provided by the train simulation computer through the output thereof; and means for connecting the receive input and the transmit output of the other data entry terminal to the train simulation computer.

15. An apparatus as defined in claim 14, further comprising:

first clock switch means for communicating a first clock signal from the train simulation computer block to the train simulation computer in response to said third switch means; and second clock switch means for communicating a second clock signal from the train simulation computer back to the train simulation computer in response to the control signal from the train simulation computer.

16. An apparatus as defined in claim 15, wherein:

the control signal provided by the train simulation computer is definable by the train simulation computer to have at any one time either a first logic level or a second logic level; and said third switch means includes:

first combinational logic gate means, connected to the control output of the one data entry means and to said means for connecting the output of the train simulation computer to said first, second and third switch means, for defining a first combinational logic signal, which is communicated to said first clock switch means so that said first clock switch means is disabled at least when the control signal provided by the train simulation computer is at its first logic level; and second combinational logic gate means, connected to said first combinational logic gate means and to said means for connecting the output of the train simulation computer to said first, second and third switch means, for defining a second combinational logic signal having a logic level the same as the control signal provided by the train simulation computer when the control signal is at the first logic level and having a logic level the same as a signal from the control output of the one data entry terminal when the control signal provided by the train simulation computer is at the second logic level.

17. An apparatus as defined in claim 14, wherein:

said first switch means includes:

a first photo-responsive transistor connected between the receive input of the one data entry terminal and the train simulation computer; and a first photodiode disposed near said first photo-responsive transistor;

said second switch means includes:

a second photo-responsive transistor connected between the transmit output of the one data entry terminal and the train simulation computer; and a second photodiode disposed near said second photo-responsive transistor; and said means for connecting the output of the train simulation computer to said first, second and third switch means includes logic gate means for connecting the output of the train simulation means to said first and second photodiodes.

18. A method of simulating train responses in a train simulator apparatus in response to actual train operating data, which train simulator apparatus includes an operating program and an operating facility for inputting simulated train operating data into the train simulator apparatus for use by the operating program thereof to generate a simulation of train responses to the simulated train operating data, said method comprising the steps of:

operating an automatic data entry terminal, which is connected to a data transfer circuit and which has a tangible recording medium therein, to transfer from the tangible recording medium to the data transfer circuit actual train operating data obtained directly from an actual operated train;

operating a manual data entry terminal, which is connected to the data transfer circuit, to provide informational data to the data transfer circuit, which informational data includes data related to the actual operated train;

controlling, through the data transfer circuit which is connected to the train simulator apparatus and in response to a control signal provided to the data transfer circuit by the train simulator apparatus, the train simulator apparatus to receive either actual train operating data provided to the data transfer circuit from the automatic data entry terminal or informational data provided to the data transfer circuit from the manual data entry terminal;

calculating, in the train simulator apparatus, simulator operation data from the data received by the train simulator apparatus from the data transfer circuit;

loading the simulator operation data on a magnetic tape of the train simulator apparatus; and using within the train simulator apparatus the data received thereby from the data transfer circuit, instead of simulated operating data from the operating facility of the train simulator apparatus, to control the operating program of the train simulator apparatus to generate a simulation of train responses to the actual train operating data, including the steps of:

reloading the simulator operation data from the magnetic tape of the train simulator apparatus into the train simulator apparatus, and using the reloaded simulator operation data in the operating program of the train simulator apparatus.

* * * * *